(12) United States Patent
Chemali et al.

(10) Patent No.: US 10,041,343 B2
(45) Date of Patent: Aug. 7, 2018

(54) MICRO-SONIC DENSITY IMAGING WHILE DRILLING SYSTEMS AND METHODS

(75) Inventors: Roland E. Chemali, Humble, TX (US); Moustafa E. Oraby, Cairo (EG)

(73) Assignee: Halliburton Energy Services, Inc., Houston, TX (US)

( * ) Notice: Subject to any disclaimer, the term of this patent is extended or adjusted under 35 U.S.C. 154(b) by 1265 days.

(21) Appl. No.: 13/813,343

(22) PCT Filed: Sep. 22, 2010

(86) PCT No.: PCT/US2010/049751
§ 371 (c)(1),
(2), (4) Date: Jan. 30, 2013

(87) PCT Pub. No.: WO2012/039707
PCT Pub. Date: Mar. 29, 2012

(65) Prior Publication Data
US 2013/0125641 A1    May 23, 2013

Related U.S. Application Data

(63) Continuation-in-part of application No. PCT/US2009/046018, filed on Jun. 2, 2009.

(51) Int. Cl.
*E21B 47/00*   (2012.01)
*G01V 1/46*    (2006.01)

(52) U.S. Cl.
CPC ............. *E21B 47/00* (2013.01); *G01V 1/46* (2013.01)

(58) Field of Classification Search
CPC . E21B 47/00; G01V 1/44; G01V 1/46; G01V 1/48; G01V 1/50; G01V 1/52
See application file for complete search history.

(56) References Cited

U.S. PATENT DOCUMENTS

| 24,383 A | 6/1859 | Eisenbrandt |
|---|---|---|
| RE24,383 E | 10/1957 | McKay |

(Continued)

FOREIGN PATENT DOCUMENTS

| AU | 2008/360702 | 6/2012 |
|---|---|---|
| AU | 2008360702 | 6/2012 |

(Continued)

OTHER PUBLICATIONS

Brown, Lisa Gottesfeld "A Survey of Image Registration Techniques", ACM Computing Surveys, vol. 24, No. 4, (Dec. 1992), 52 pgs.

(Continued)

*Primary Examiner* — Natalie Huls
(74) *Attorney, Agent, or Firm* — Gilliam IP PLLC

(57) ABSTRACT

Various micro-sonic density imaging-while-drilling systems and methods are disclosed. In at least some forms, the micro-sonic logging tool is embodied in a drill collar having at least one stabilizer blade. One or more acoustic transmitters are set in a distal face of the stabilizer blade to generate acoustic waves. One or more receivers can also be set in the distal face of the stabilizer blade to detect P-waves and S-waves that have propagated through the formation making up the borehole wall. Processing circuitry measures the velocity or slowness of the acoustic waves and optionally associates the measured values with a spot on the borehole wall as identified. Multiple transmitters can be used if it is desired to obtain compensated measurements. The tool can further include a fluid cell to measure acoustical properties of the borehole fluid, which can be used to convert the formation slowness measurements into density measurements.

10 Claims, 4 Drawing Sheets

(56) References Cited

U.S. PATENT DOCUMENTS

| | | | |
|---|---|---|---|
| 3,244,882 A | 4/1966 | Baldwin et al. | |
| 3,413,471 A | 11/1968 | Tittman | |
| 3,772,513 A | 11/1973 | Hall, Jr. et al. | |
| 3,930,154 A | 12/1975 | Scott | |
| 3,979,300 A | 9/1976 | Paap et al. | |
| 4,191,884 A | 3/1980 | Scott | |
| 4,209,695 A | 6/1980 | Arnold et al. | |
| 4,319,192 A | 3/1982 | Chemali et al. | |
| 4,331,975 A | 5/1982 | Krawza et al. | |
| 4,379,228 A | 4/1983 | Allen | |
| 4,404,467 A | 9/1983 | Schweitzer et al. | |
| 4,424,444 A | 1/1984 | Smith, Jr. et al. | |
| 4,545,242 A | 10/1985 | Chan | |
| 4,646,026 A | 2/1987 | Chemali et al. | |
| 4,701,891 A * | 10/1987 | Castagna et al. | 367/31 |
| 4,745,562 A | 5/1988 | Prazdny | |
| 4,779,236 A * | 10/1988 | Sondergeld | 367/31 |
| 4,852,005 A | 7/1989 | Hepp et al. | |
| 4,918,669 A | 4/1990 | Chemali et al. | |
| 5,038,107 A | 8/1991 | Gianzero et al. | |
| 5,081,351 A | 1/1992 | Roscoe | |
| 5,097,123 A | 3/1992 | Grau et al. | |
| 5,265,016 A | 11/1993 | Hanson et al. | |
| 5,432,446 A | 7/1995 | MacInnis et al. | |
| 5,517,024 A | 5/1996 | Mullins et al. | |
| 5,565,624 A | 10/1996 | Deboaisne et al. | |
| 5,581,024 A | 12/1996 | Meyer et al. | |
| 5,652,617 A | 7/1997 | Barbour | |
| 5,663,559 A | 9/1997 | Auzerais et al. | |
| 5,668,369 A | 9/1997 | Oraby | |
| 5,838,633 A * | 11/1998 | Sinha | 367/31 |
| 5,852,587 A * | 12/1998 | Kostek et al. | 367/25 |
| 5,900,627 A | 5/1999 | Odom et al. | |
| 6,041,860 A | 3/2000 | Nazzal et al. | |
| 6,072,314 A | 6/2000 | Oraby | |
| 6,351,991 B1 | 3/2002 | Sinha | |
| 6,366,531 B1 * | 4/2002 | Varsamis et al. | 367/26 |
| 6,373,970 B1 | 4/2002 | Dong | |
| 6,377,050 B1 | 4/2002 | Chemali et al. | |
| 6,405,136 B1 | 6/2002 | Li et al. | |
| 6,456,566 B1 | 9/2002 | Aronstam | |
| 6,564,883 B2 * | 5/2003 | Fredericks et al. | 175/50 |
| 6,600,321 B2 | 7/2003 | Evans | |
| 6,631,327 B2 * | 10/2003 | Hsu et al. | 702/6 |
| 6,643,221 B1 * | 11/2003 | Hsu et al. | 367/162 |
| 6,678,616 B1 | 1/2004 | Winkler et al. | |
| 6,850,068 B2 | 2/2005 | Chemali et al. | |
| 6,868,036 B2 | 3/2005 | Wang et al. | |
| 6,909,666 B2 | 6/2005 | Dubinsky et al. | |
| 6,930,616 B2 * | 8/2005 | Tang et al. | 340/854.4 |
| 6,936,812 B2 | 8/2005 | Odom et al. | |
| 6,957,700 B2 | 10/2005 | Mandal | |
| 6,957,708 B2 | 10/2005 | Chemali et al. | |
| 7,039,524 B2 * | 5/2006 | Haugland | 702/6 |
| 7,063,174 B2 | 6/2006 | Chemali et al. | |
| 7,098,664 B2 | 8/2006 | Bittar et al. | |
| 7,099,810 B2 | 8/2006 | Mandal | |
| 7,114,565 B2 | 10/2006 | Estes et al. | |
| 7,161,721 B2 | 1/2007 | Young | |
| 7,272,504 B2 | 9/2007 | Akimov et al. | |
| 7,375,530 B2 | 5/2008 | Chemali et al. | |
| 7,400,262 B2 | 7/2008 | Chemali et al. | |
| 7,405,563 B2 | 7/2008 | Kruspe et al. | |
| 7,414,918 B2 | 8/2008 | Hurst et al. | |
| 7,460,435 B2 | 12/2008 | Garcia-Osuna et al. | |
| 7,483,793 B2 | 1/2009 | Wang et al. | |
| 7,522,471 B2 | 4/2009 | Froelich et al. | |
| 7,634,059 B2 | 12/2009 | Wraight | |
| 7,705,878 B2 | 4/2010 | Mandal et al. | |
| 7,723,991 B2 | 5/2010 | Signorelli et al. | |
| 7,839,149 B2 | 11/2010 | Wang et al. | |
| 7,894,990 B2 | 2/2011 | Wang et al. | |
| 7,994,790 B2 | 2/2011 | Itskovich et al. | |
| 7,915,895 B2 | 3/2011 | Chemali et al. | |
| 7,973,532 B2 | 7/2011 | Forgang et al. | |
| 8,008,919 B2 | 8/2011 | Wang et al. | |
| 8,134,476 B2 | 3/2012 | Chemali et al. | |
| 8,164,339 B2 | 4/2012 | Fang et al. | |
| 8,332,152 B2 | 12/2012 | Itskovich et al. | |
| 8,387,743 B2 | 3/2013 | Oraby | |
| 8,440,960 B2 | 5/2013 | Oraby et al. | |
| 8,510,051 B2 | 8/2013 | Oraby | |
| 2002/0014583 A1 | 2/2002 | Bothner | |
| 2002/0113717 A1 * | 8/2002 | Tang et al. | 340/854.4 |
| 2002/0116128 A1 | 8/2002 | Sinha et al. | |
| 2003/0038634 A1 | 2/2003 | Strack | |
| 2004/0160514 A1 | 8/2004 | Tawfig et al. | |
| 2004/0222368 A1 | 11/2004 | Odom et al. | |
| 2005/0006090 A1 * | 1/2005 | Chemali et al. | 166/250.01 |
| 2005/0078555 A1 * | 4/2005 | Tang et al. | 367/31 |
| 2006/0015257 A1 | 1/2006 | Hassan et al. | |
| 2006/0198242 A1 | 9/2006 | Geerits et al. | |
| 2007/0035736 A1 | 2/2007 | Vannuffelen et al. | |
| 2007/0280048 A1 * | 12/2007 | Dubinsky et al. | 367/31 |
| 2008/0179510 A1 | 7/2008 | Jacobi | |
| 2008/0319675 A1 * | 12/2008 | Sayers | 702/11 |
| 2009/0005995 A1 * | 1/2009 | Tang et al. | 702/11 |
| 2009/0091320 A1 | 4/2009 | Flaum et al. | |
| 2009/0147907 A1 | 6/2009 | Wraight | |
| 2009/0166035 A1 | 7/2009 | Almaguer | |
| 2010/0020638 A1 | 1/2010 | Mickael et al. | |
| 2010/0262371 A1 | 10/2010 | Oraby | |
| 2010/0312477 A1 | 12/2010 | Sanstrom et al. | |
| 2011/0204217 A1 | 8/2011 | Oraby et al. | |
| 2011/0284314 A1 | 11/2011 | Oraby | |
| 2011/0286307 A1 * | 11/2011 | Wang | 367/82 |
| 2012/0169841 A1 | 7/2012 | Chemali et al. | |
| 2013/0282289 A1 * | 10/2013 | Lotfy et al. | 702/7 |

FOREIGN PATENT DOCUMENTS

| | | |
|---|---|---|
| GB | 2468224 | 7/2012 |
| WO | WO-03/023454 | 3/2003 |
| WO | WO-2010/021622 | 2/2010 |
| WO | WO-2010/039121 | 4/2010 |
| WO | WO-2010/039122 | 4/2010 |
| WO | WO-2011/038170 | 3/2011 |
| WO | WO-2012/039707 | 3/2012 |

OTHER PUBLICATIONS

Sohrabpour, M. et al., "Borehole Prompt Gamma Neutron Activation and Comparison with Monte Carlo Simulation Using MCNP Code", Borehole PGNAA Experiment Comparison with MCNP, Pergamon, Applied Radiation and Isotopes 50 (1999) 805-810, Elsevier Science Ltd., (1999), 6 pgs.

The American Heritage Dictionary, ""Code" Defined", Third Edition, p. 366 (3d Ed. 1992) (Definition No. 4), 9 pgs.

Wikipedia, "Cross-Correlation", http://en.wikipedia.org/wiki/Cross-correlation, (Oct. 19, 2008), 3 pgs.

Wikipedia, "Image Registration", http://en.wikipedia.org/wiki/Image_registration, (Oct. 19, 2008), 3 pgs.

Wikipedia, "Phase Correlation", http://en.wikipedia.org/wiki/Phase_correlation, (Oct. 19, 2008), 3 pgs.

Willis, et al., "Automatic P and S Velocity Determination from Full Waveform Digital Acoustic Logs", Geophysics, V48 n12, Dec. 1983, pp. 1631-1644, pp. 1631-1644.

"PCT International Preliminary Report on Patentability", dated Apr. 4, 2013, Application No. PCT/US10/49751, "Micro-Sonic Density Imaging While Drilling Systems and Methods", filed Sep. 22, 2010, 4 pgs.

"SG Written Opinion", dated Nov. 11, 2013, Appl. No. 201300873-5, "Micro-Sonic Density Imaging While Drilling Systems and Methods", filed Feb. 4, 2013, 13 pgs.

Brown, Lisa Gottesfeld "A Survey of Image Registration Techniques", ACM Computing Surveys, vol. 24, No. 4, Dec. 1992, 52 pgs.

Crain, E.R. (Ross) "Fracture Identification from Image Logs", Crain's Petrophysical Handbook, no dates, 16 pgs.

(56) References Cited

OTHER PUBLICATIONS

Heysse, et al., "Field Tests of an Acoustic Logging-While-Drilling Tool in Various Borehole Environments", SPWLA 37th Annual Logging Symposium, Jun. 16-19, 1996, pp. 1-11.

Prammer, Manfred G., et al., "Field Testing of an Advanced LWD Imaging/Resistivity Tool", SPWLA 48th Annual Logging Symposium, (Jun. 3, 2007), pp. 1-15.

Sohrabpour, M. et al., "Borehole Prompt Gamma Neutron Activation and Comparison with Monte Carlo Simulation Using MCNP Code", Borehole PGNAA Experiment Comparison with MCNP, Pergamon, Applied Radiation and Isotopes 50 (1999) 805-810, Elsevier Science Ltd., 6 pgs.

The American Heritage Dictionary, ""CODE" Defined", Third Edition, (3d Ed. 1992) (Definition No. 4), 9 pgs.

Wikipedia, "Cross-Correlation", http://en.wikipedia.org/wiki/Cross-correlation, Oct. 19, 2008, 3 pgs.

Wikipedia, "Formation Evaluation Neutron Porosity", Wikipedia, http://en.wikipedia.org/wiki/Formation evaluation neutron porosity, Oct. 16, 2008, 2 pgs.

Wikipedia, "Image Registration", http://en.wikipedia.org/wiki/Image_registration, Oct. 19, 2008, 3 pgs.

Wikipedia, "Phase Correlation", http://en.wikipedia.org/wiki/Phase_correlation, Oct. 19, 2008, 3 pgs.

Willis, et al., "Automatic P and S Velocity Determination from Full Waveform Digital Acoustic Logs", Geophysics, V48 n12, Dec. 1983, pp. 1631-1644.

\* cited by examiner

FIG. 1
FIG. 2
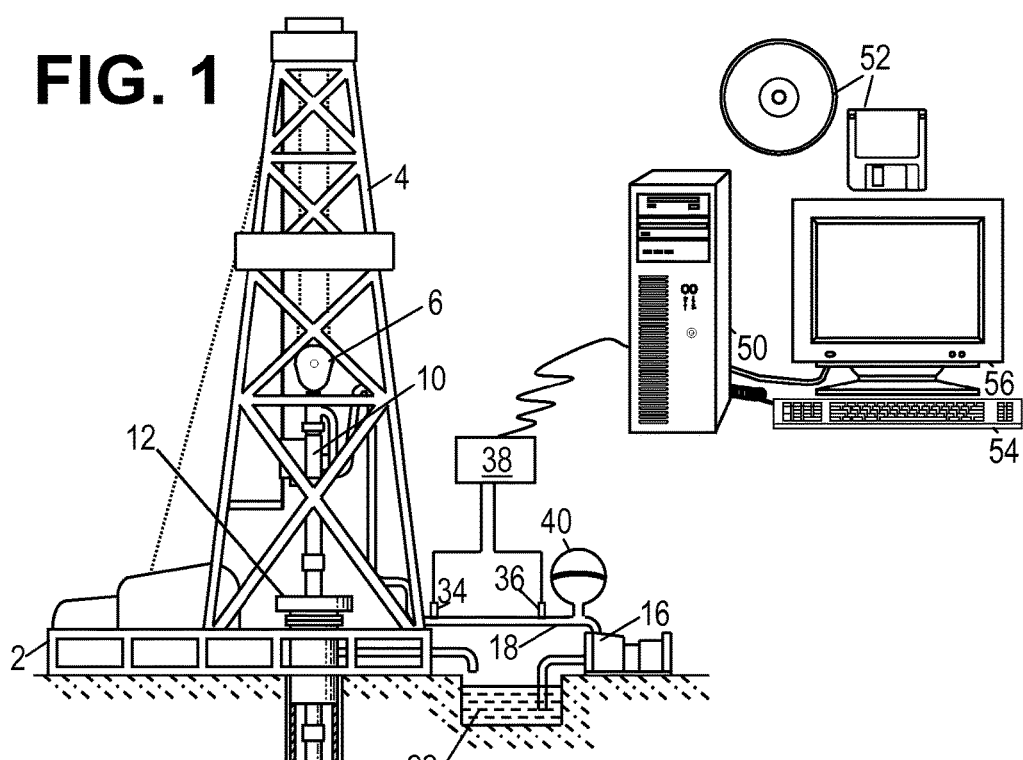
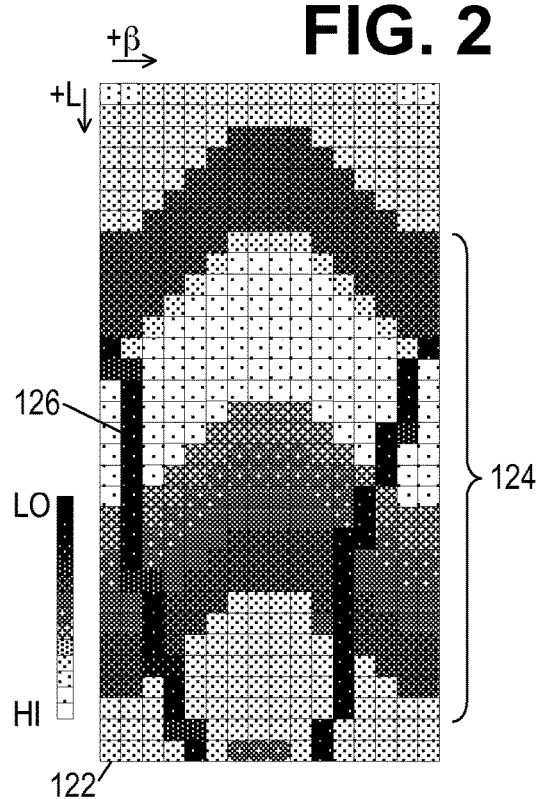

FIG. 9
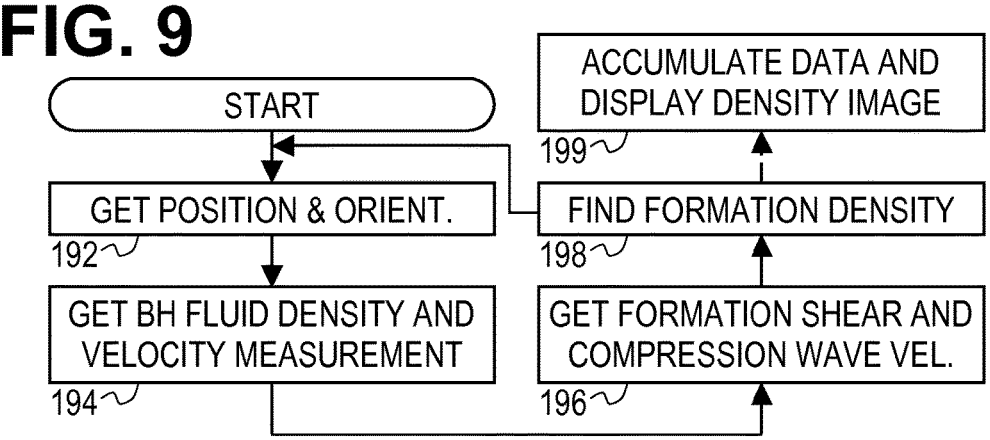
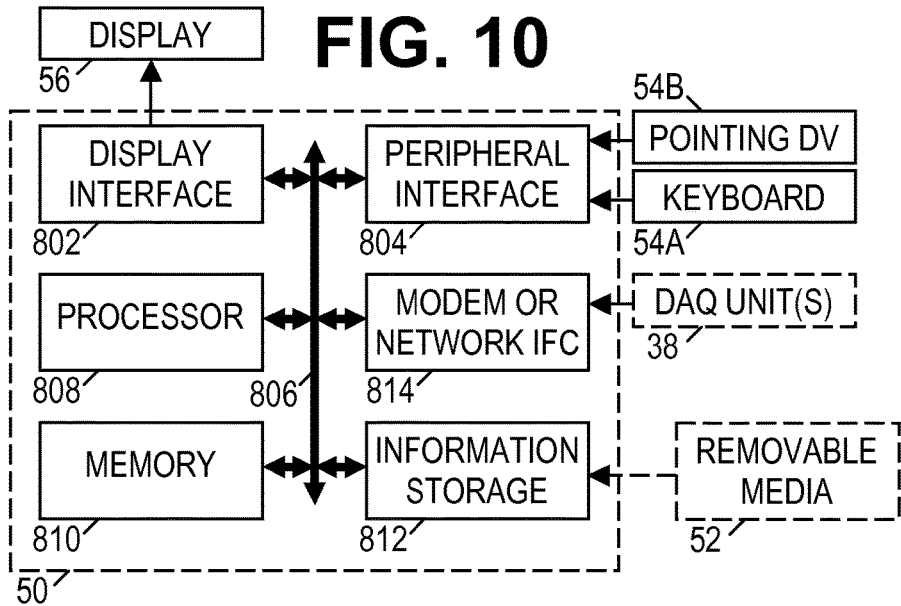
FIG. 10

MICRO-SONIC DENSITY IMAGING WHILE DRILLING SYSTEMS AND METHODS

RELATED APPLICATIONS

The present application is a continuation in part of PCT/US09/46018 "System and method for acoustically measuring bulk density", filed Jun. 2, 2009 by Moustafa Oraby, which is hereby incorporated by reference.

BACKGROUND

In the quest for hydrocarbon reservoirs, companies employ many data-gathering techniques. The most detailed, albeit localized, data comes from well logging. During the well-drilling process, or shortly thereafter, drillers pass logging instruments through the well bore to collect information about the surrounding formations. The information is traditionally collected in "log" form, i.e., a table, chart or graph of measured data values as a function of instrument position. The most sought-after information relates to the location and accessibility of hydrocarbon gases and fluids. Resistivity, density, and porosity logs have proven to be particularly useful for this purpose. These logs are "open hole" logs, i.e., log measurements that are taken before the formation face is sealed with tubular steel casing. Such logs can be collected by several methods including wireline logging and logging while drilling (LWD).

In wireline logging, a sonde is lowered into the borehole after some or the entire well has been drilled. The sonde hangs at the end of a long cable (a "wireline") that provides mechanical support and an electrical connection between the sonde and logging equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

When the position information for the logging instrument includes both depth and orientation, the log can take the form of a two-dimensional "image" of the borehole wall. Imaging enables analysts to study the fine-scale structure of the penetrated formations, including stratifications, fractures, dip angles, rock texture, vugs, and other features and anomalies. Most imaging tools are wireline logging tools, though at least some LWD imaging tools have been proposed. See, e.g., U.S. Pat. No. 6,600,321 (Evans); U.S. Pat. No. 7,098,664 (Bittar); U.S. Pat. No. 7,272,504 (Akimov); U.S. Pat. No. 6,678,616 (Winkler). There do not appear to be any logging while drilling tools that can provide a sonic density image log.

BRIEF DESCRIPTION OF THE DRAWINGS

An understanding of the disclosed embodiments can be obtained when the following detailed description is considered in conjunction with the drawings, in which:

FIG. 1 is an illustrative view of a logging-while-drilling (LWD) environment;

FIG. 2 is an illustrative borehole wall image;

FIG. 9 is a flowchart of an illustrative sonic density imaging method; and

FIG. 10 is a block diagram of an illustrative computer system.

Figure 3:
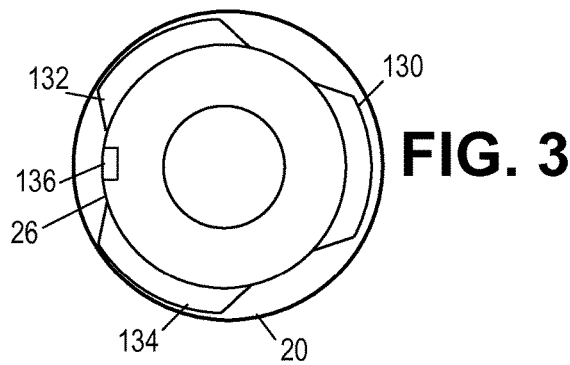
FIG. 3 is a cross-sectional view of an illustrative LWD imaging tool.

While the invention is susceptible to various modifications and alternative forms, specific embodiments thereof are shown by way of example in the drawings and will herein be described in detail. It should be understood, however, that the drawings and detailed description thereof are not intended to limit the invention to the particular forms disclosed, but on the contrary, the intention is to cover all modifications, equivalents and alternatives falling within the scope of the appended claims.

DETAILED DESCRIPTION

Disclosed herein are various micro-sonic density imaging-while-drilling systems and methods. In at least some forms, the micro-sonic logging tool is embodied in a drill collar having at least protrusion (e.g., a stabilizer blade). One or more acoustic transmitters are set in a distal face of the protrusion to generate acoustic waves. One or more receivers can also be set in the distal face of the protrusion to detect P-waves and S-waves that have propagated through the formation making up the borehole wall. Processing circuitry (e.g., a processor executing software or firmware, or an application specific integrated circuit) measures the velocity or slowness of the acoustic waves and optionally associates the measured values with a spot on the borehole wall as identified, e.g., by the tool position and rotational orientation at the time the measurement is made. A motion tracking unit can be included in the bottomhole assembly for this purpose. If a pair of receivers is used, the tool resolution is commensurate with the spacing between the receivers. Multiple transmitters can be used if it is desired to obtain compensated measurements. The tool can further include a fluid cell to measure acoustical properties of the borehole fluid, which can be used to convert the formation slowness measurements into density measurements. The logging data is usually stored in a non-volatile information storage medium and viewed by drilling engineers or other personnel interested in learning more about the formation.

At least some of the method embodiments include: rotating a logging-while-drilling tool as it moves along a borehole; detecting acoustic waves propagating along a wall of the borehole using at least two receivers on a distal face of a protrusion on the tool (e.g., on a stabilizer blade); processing signals from the receivers to measure P-wave and S-wave velocities or slowness values; and associating the velocities or slowness values with the tool's position and orientation. The velocities or slowness values are used to generate a borehole wall image representing either the slowness values themselves or other formation properties (e.g., density) derived from the slowness values. We note that the transmitter(s) and receivers need not be positioned on the same stabilizer blade—in some embodiments the transmitter(s) are on the distal surface of a separate stabilizer blade.

The disclosed embodiments can be best understood in the context of their environment. Accordingly, FIG. 1 shows an illustrative logging while drilling (LWD) environment. A drilling platform 2 is equipped with a derrick 4 that supports a hoist 6. Rig operators drill oil and gas wells using a string of drill pipes 8. The hoist 6 suspends a top drive 10 that is used to rotate the drill string 8 and to lower the drill string through the wellhead 12. Connected to the lower end of the drill string 8 is a drill bit 14. The bit 14 is rotated and drilling accomplished by rotating the drill string 8, by use of a downhole motor near the drill bit, or by both methods. Mud recirculation equipment 16 pumps drilling fluid through supply pipe 18, through top drive 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 22 on the surface. On the surface, the drilling mud is cleaned and then recirculated by recirculation equipment 16. The drilling mud cools the drill bit 14, carries cuttings from the base of the bore to the surface, and balances the hydrostatic pressure in the rock formations.

The bottomhole assembly (i.e., the lowermost part of drill string 8) includes thick-walled tubulars called drill collars to add weight and rigidity to aid the drilling process. The thick walls of these drill collars make them useful for housing instrumentation and LWD sensors. Thus, for example, the bottomhole assembly of FIG. 1 includes a natural gamma ray detector 24, a micro-sonic imaging tool 26, a resistivity tool 28, a porosity tool 30, and a control & telemetry module 32. Other tools and sensors can also be included in the bottomhole assembly to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

As the bit extends the borehole through the formations, micro-sonic imaging tool 26 rotates and collects acoustic wave slowness measurements that a downhole controller associates with tool position and orientation measurements to form a slowness image map of the borehole wall. Control/telemetry module 32 collects data from the micro-sonic tool and the other bottomhole assembly instruments and stores them in internal memory. Selected portions of the data can be communicated to the surface by, e.g., mud pulse telemetry. Other logging-while drilling telemetry methods also exist and could be employed. As one particular example, the drillstring 8 could be formed from wired drillpipe that enables waveforms or images to be transmitted to the surface in real time to enable quality control and processing to optimize the logging resolution.

For mud pulse telemetry, telemetry module 32 modulates a resistance to drilling fluid flow to generate pressure pulses that propagate to the surface. One or more pressure transducers 34, 36 (isolated from the noise of the mud pump 16 by a desurger 40) convert the pressure signal into electrical signal(s) for a signal digitizer 38. The digitizer 38 supplies a digital form of the pressure signals to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to obtain and view an sonic density image log.

FIG. 2 shows an illustrative borehole wall image 122 that results when formation measurements (such as acoustic slowness or density) are associated with tool position L and rotational orientation β. The surface of the borehole wall is divided into "bins", with each bin representing a pair of tool position L and rotational orientation β values. Each time the sensing surface passes a bin, it gathers one or more slowness measurements that can be combined with previous measurements for that bin. The combined measurements can then be processed (as discussed further below) to obtain a density estimate that can be displayed as a pixel color and/or a pixel intensity. Such an image often reveals bedding structures (such as structures 124) and fractures (such as fracture 126). Such features often exhibit a sinusoidal dependence on rotational angle, indicating that the borehole encountered the feature at an angle other than 90 degrees. We note here that such features are usually apparent even if the density measurements are only relative in nature rather than precisely accurate. The image resolution is largely determined by the measurement resolution of the sensing surface. The measurement resolution depends not only on the size and spacing of the acoustic receivers, but also on the standoff between the borehole wall and the sensing surface, and to some extent upon the signal frequency.

Figure 4:
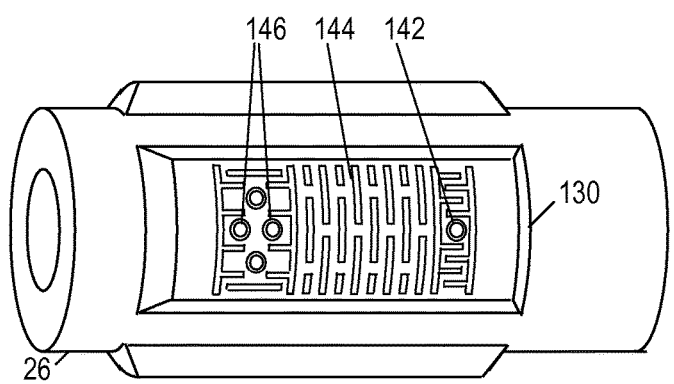
FIG. 4 is a side view of an illustrative embodiment of an LWD imaging tool.
Figure 5:
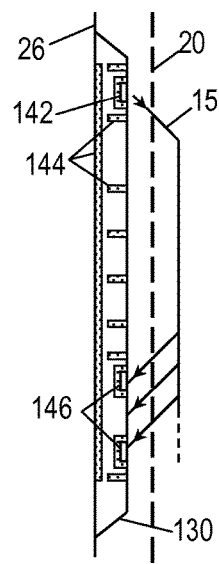
FIG. 5 shows the propagation of an acoustic wave in the borehole wall.

FIG. 3 shows a cross-section of an illustrative LWD embodiment of sonic logging tool 26 in a borehole 20. The logging tool 26 shown includes three stabilizer blades 130, 132, 134 that keep the tool centralized. The precise configuration and number of stabilizer blades can vary based on the expected drilling environment and should in general be expected to increase in number as the borehole diameter increases. FIG. 4 shows a side view of the illustrative tool embodiment, while FIG. 5 shows a cross-section detail. In these views it can be seen that the distal face of the stabilizer blade has an inset transmitter 142 separated from an array of inset receivers 146 by an acoustic isolation zone. The acoustic isolation zone is designed to attenuate and delay acoustic wave energy propagating via through the tool body from the transmitter to the receivers. To that end, the acoustic isolation zone can include voids or inserts 144 that provide an arrangement of acoustic contrasts to reflect and attenuate acoustic wave energy. Inserts 144 can be made of a resilient material (e.g., vulcanized rubber) that efficiently dissipates acoustic wave energy as heat, thereby providing further attenuation. Careful design of the void shapes can create a series of acoustic propagation paths that cause destructive interference at the receivers over a desired frequency band. By reducing and delaying the acoustic wave energy that reaches the receivers through the tool body, the acoustic isolation zone improves the sensitivity of the receivers to the acoustic wave energy 152 propagating through the borehole wall.

In some embodiments, the acoustic transmitters are electrical transducers made of a piezoelectric material, enabling the tool to generate programmable acoustic signals. Alternatively, bender bars or other acoustic transducers can be used. The receivers can be electrical transducers made of a piezoelectric material. In some embodiments, the transmitter and receiver transducers are flush with the surface of a wall-contacting face to minimize standoff, while in other embodiments the transducers are slightly inset, covered with a protective layer, and/or set in a protrusion face that is kept at a small standoff from the borehole wall to prevent undue erosion of the transducers. In some embodiments, the transducers are inset by approximately ⅛ inch, or possibly up to about ¼ inch, and the total inset area surrounding the transducer is no more than 10 times the sensing area of the transducer itself. In other embodiments, the distal face of the protrusion is kept at a small standoff (e.g., about 1/10 of an inch) as the tool rotates within the borehole. This configuration could be achieved using a set of stabilizers on either side of the tool, with a slightly larger outer diameter than the circle traced by the distal face of the tool protrusion(s). Some designs angle the transmitter and receiver transducers towards each other to increase the signal strength.

At least two receivers are preferably employed, enabling the tool to make slowness measurements having a resolution on the order of the spacing between the receivers. One or more laterally spaced receivers can be added to enable direction-of-arrival determination. Such measurements enable the tool to correct for the effects of tool rotation.

The contemplated operating frequencies for the sonic logging tool are in the range between 50 kHz and 150 kHz, inclusive. The operating frequency may be selected on the basis of a tradeoff between attenuation and wavelength in which the wavelength is minimized subject to requirements for limited attenuation. Subject to the attenuation limits on performance, smaller wavelengths may offer improved spatial resolution of the tool. When the sonic logging tool is enabled, the internal controller controls the triggering and timing of the acoustic source 142, and records and processes the signals from the receivers 146. The internal controller fires the acoustic source 142 periodically, producing acoustic pressure waves that propagate into the formation and along the borehole wall 20. As these pressure waves propagate past the array of receivers 146, they cause pressure variations that can be detected by the receiver transducers.

Figure 6:
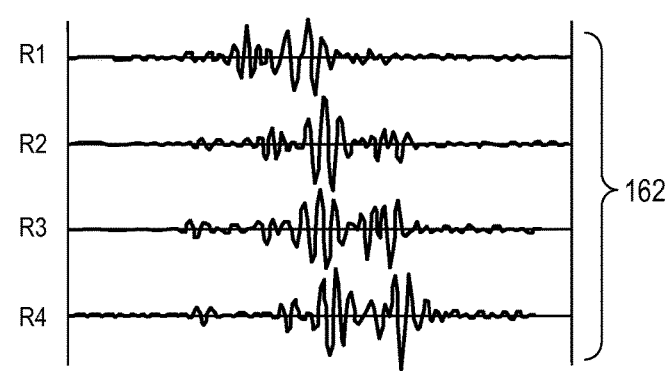
FIG. 6 shows illustrative receive waveforms.

FIG. 6 shows a set of illustrative signals 162 detected by the acoustic receivers in response to having the transmitter driven with a pulsed sine wave. The internal controller can process the signals in accordance with the principles and techniques provided in Willis and Toksoz, "Automatic P and S velocity determination from full waveform digital acoustic logs", Geophysics, v48 n12, December 1983, p 1631-44, to determine arrival time delays between the various receivers for P-waves and S-waves. Differences in arrival times represent the propagation delay, which is combined with the distance information to obtain slowness, i.e., the inverse of velocity. Because they can be readily derived from each other, the terms "slowness" and "velocity" are sometimes used interchangeably.

We note that in at least some cases the detected waveforms will represent a variety of wave types, including waves propagating through the body of the tool (tool waves), compression waves from the formation (P-waves), shear waves from the formation (S-waves), waves propagating through the borehole fluid (mud waves), and Stoneley waves propagating along the borehole wall. If desired, the controller can process the signals using semblance processing techniques such as those disclosed by B. Mandal in U.S. Pat. No. 7,099,810 to separate the different wave types and determine their individual slownesses.

The receiver array signals may be processed by a downhole controller to determine $V_S$ (the formation shear wave velocity) and $V_C$ (the formation compression wave velocity), or the signals may be communicated to the uphole computer system for processing. The measurements are associated with borehole position and tool orientation to generate one or more images of the acoustical properties of the borehole wall. The log or image is stored and ultimately displayed for viewing by a user.

Figure 7:
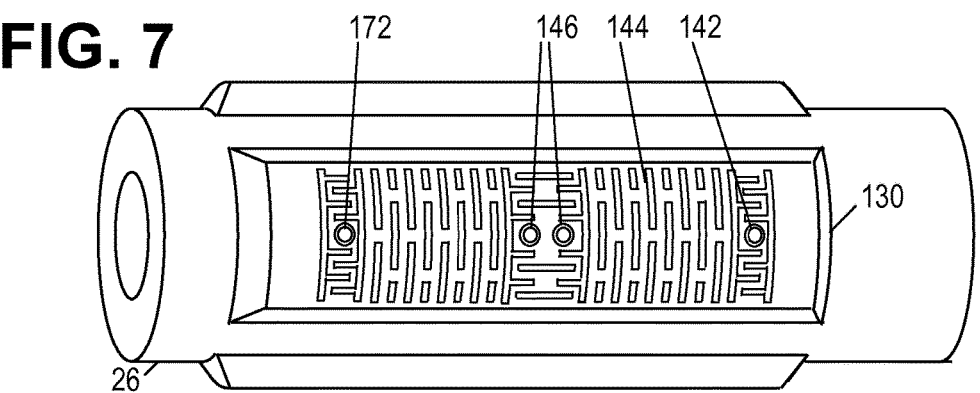
FIG. 7 is a side view of an alternative embodiment of an LWD imaging tool.

FIG. 7 shows an alternative tool embodiment having a second transmitter 172. The two transmitters and two receivers are co-linear, with the two receivers being equally-spaced from the midpoint between the two transmitters. The receivers' responses to each of the two transmitters can be combined to form compensated measurements that automatically account for minor differences in the electronics for each receiver. (Specifically, because the receivers switch roles as the "near" and "far" receivers, any minor timing or attenuation differences will cancel out when the responses to the opposite transmitters are averaged together.) Such processing also helps compensate for borehole rugosity.

In the illustrated embodiment, the line is parallel to the tool axis, but this is not a requirement. In alternative embodiments, the stabilizer blades twist to form a partial spiral along the outer surface of the drill collar. In such embodiments, the transmitters and receivers may be aligned along the midline of a stabilizer blade's distal face. In still other embodiments, the transmitters are embedded in stabilizer blades different from the stabilizer blade in which the receivers are embedded.

Returning to FIG. 3, the illustrative sonic logging tool 26 includes a fluid cell 136 located between stabilizer blades 132,134 and opposite the slowness-measuring stabilizer blade 130. The fluid cell measures acoustic properties of the borehole fluid. Specifically, the fluid cell measures $V_M$, the velocity of compression waves in the borehole fluid and $\rho_H$, the density of the borehole fluid. (Alternatively, the acoustic impedance $Z_M = \rho_M V_M$ can be measured.) Various suitable fluid cells exist in the art, such as e.g., the fluid cell employed by the Halliburton CAST-V™ wireline tool, or that disclosed by B. Mandal, U.S. Pat. No. 6,957,700 "Self-calibrated ultrasonic method of in-situ measurement of borehole fluid acoustic properties". The fluid cell 136 can be operated in a manner that avoids interference from firings of the source 142, e.g., the borehole fluid property measurements can be made while the source 142 is quiet, and the formation wave velocity measurements can be made while the fluid cell is quiet.

Figure 8:
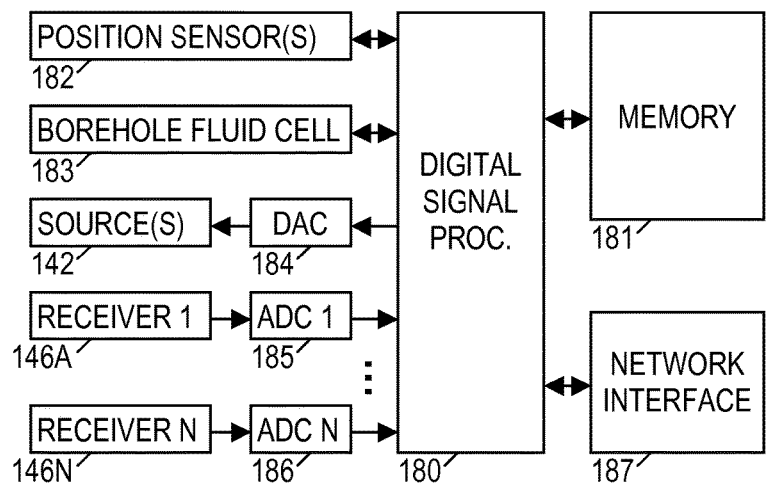
FIG. 8 is a functional block diagram of illustrative tool electronics.

FIG. 8 is a functional block diagram of the illustrative sonic logging tool 26. A digital signal processor 180 operates as an internal controller for tool 26 by executing software stored in memory 181. The software configures the processor 180 to collect measurements from various measurement modules such as position sensor 182 and fluid cell 183. (Note that these modules can alternatively be implemented as separate tools in the bottomhole assembly, in which case such measurements would be gathered by a control/telemetry module.)

The software further configures the processor 180 to fire the source(s) 142 via a digital to analog converter 184, and further configures the processor 180 to obtain receive waveforms from the array of receivers 146A-146N via analog to digital converters 184-186. The digitized waveforms can be stored in memory 181 and/or processed to determine compression and shear wave velocities. As explained further below, the processor can combine the compression and shear wave velocities with measurements of drilling fluid velocity and density to obtain an estimate of formation density. Alternatively, these measurements can be communicated to a control module or a surface processing facility to be combined there. In either case, the formation density estimates are associated with the position of the logging tool to provide a density log. A network interface 187 connects the sonic logging tool to a control/telemetry module via a tool bus, thereby enabling the processor 180 to communicate information to the surface (e.g., velocity measurements or density logs) and to receive commands from the surface (e.g., activating the tool or changing its operating parameters).

Given the foregoing context, we now turn to a summary of the sonic density measurement technique disclosed in PCT/US09/46018 "System and method for acoustically measuring bulk density", filed Jun. 2, 2009 by Moustafa Oraby, and hereby incorporated herein by reference. The disclosed measurement technique relates the acoustic transmission coefficient T to the breakdown resistance μB, producing the equation:

$$\ln(T) = a_0 + a_1 \ln(\mu B) + a_2 (\ln(\mu B))^2 + \quad (1)$$

When expanded in terms of the density of the borehole fluid ("mud") $\rho_M$, the acoustic velocity of the borehole fluid $V_M$, the bulk density of the formation $\rho_b$, the acoustic velocity of compressional waves in the formation $V_C$, and the acoustic velocity of shear waves in the formation $V_S$, equation (1) becomes:

$$\ln\left(\frac{2\rho_m V_m}{\rho_b V_C + \rho_m V_m}\right) = \quad (2)$$

$$a_0 + a_1 \ln\left(\rho_b^2\left(V_C^2 V_S^2 - \frac{4}{3}V_S^4\right)\right) + a_2\left[\ln\left(\rho_b^2\left(V_C^2 V_S^2 - \frac{4}{3}V_S^4\right)\right)\right]^2 + \ldots$$

In one experiment, the coefficients for a range of transmission coefficients between about 0.15 and 0.85 were measured and were found to be $a_0 = -0.8513$, $a_1 = -0.2203$, $a_2 = -0.009$, and $a_3 = 0.0009$. Inspection of equation (2) reveals that when the logging tool is designed to measure compressional and shear wave velocities of the formation as well as density and acoustic velocity of the borehole fluid, the only remaining unknown is the bulk density of the formation. In other words, equation (2) can be rewritten in the form:

$$F(\rho_b, \rho_m, V_m, V_C, V_S) = 0 \quad (3)$$

in which the formation density is the only unknown, enabling it to be determined using standard numerical computation techniques.

FIG. 9 is a flowchart of an illustrative density imaging method that employs this principle. It is assumed that the equation coefficients $a_i$ have been previously determined during calibration of the tool, although this is not required. Beginning in block 192, the rotational orientation and position of the logging tool along the borehole is determined. This determination can be performed using a motion sensing and orientation tracking module. In block 194, the acoustical properties of the borehole fluid are measured using a fluid cell. The measured properties include the acoustic impedance of the borehole fluid, or alternatively the density of the fluid and the propagation velocity of acoustic waves through the fluid. In block 196, the logging tool measures the propagation velocities of shear waves and compressional waves through the formation and associates them with the current tool position and orientation. In block 198, the acoustic measurements for the borehole fluid and the formation are combined to calculate the formation density for the current tool position, and the process repeats beginning with block 192. In block 199, the density calculations are accumulated and made available in perceptible form to a user as an image of the borehole wall.

The functions described in FIG. 9 can be distributed throughout the logging system or concentrated within the internal processor for the logging tool. Thus, for example, the position measurements, fluid measurements, and formation wave velocity measurements can be made by separate tools and communicated to a separate processing facility where the density calculation is performed. Moreover, the functions can be carried out in a parallel or asynchronous fashion even though they are described for explanatory purposes as occurring in a sequential order.

FIG. 10 is a block diagram of an illustrative surface processing system suitable for collecting, processing, and displaying logging data. In some embodiments, a user may further interact with the system to send command to the bottom hole assembly to adjust its operation in response to the received data. The system of FIG. 10 can take the form of a computer that includes a chassis 50, a display 56, and one or more input devices 54A, 54B. Located in the chassis 50 is a display interface 802, a peripheral interface 804, a bus 806, a processor 808, a memory 810, an information storage device 812, and a network interface 814. Bus 806 interconnects the various elements of the computer and transports their communications.

In at least some embodiments, the surface telemetry transducers are coupled to the processing system via a data acquisition unit 38 and the network interface 814 to enable the system to communicate with the bottom hole assembly. In accordance with user input received via peripheral interface 804 and program instructions from memory 810 and/or information storage device 812, the processor processes the received telemetry information received via network interface 814 to construct formation property logs (including one or more borehole wall images) and to display them to the user.

The processor 808, and hence the system as a whole, generally operates in accordance with one or more programs stored on an information storage medium (e.g., in information storage device 812 or removable information storage media 52). Similarly, the bottom hole assembly control module and/or internal controller for the sonic logging tool 26 operates in accordance with one or more programs stored in an internal memory. One or more of these programs configures the tool controller, the bottomhole assembly control module, and the surface processing system to individually or collectively carry out at least one of the density logging methods disclosed herein.

Numerous variations and modifications will become apparent to those skilled in the art once the above disclosure is fully appreciated. For example, the wave velocities can be measured as slowness values or propagation delays. As another example, the transducers can be mounted in distal faces of protrusions other than stabilizer blades, e.g., steering fins, extendable pads, or the body of a decentralized tool. As yet another example, borehole fluid properties can optionally be measured at the surface rather than downhole. It is intended that the following claims be interpreted to embrace all such variations and modifications.

What is claimed is:

1. A logging method that comprises:
   rotating a logging-while-drilling tool as it moves along a borehole;

detecting acoustic waves propagating along a wall of the borehole using at least two receivers;

processing signals from the receivers to measure formation density values; and associating the formation density values with the tool's position and orientation.

2. The method of claim 1, further comprising displaying a borehole wall image calculated based at least in part on the formation density values.

3. The method of claim 1, wherein the processing includes measuring P-wave and S-wave slowness values and determining said formation densities based at least in part on the P-wave and S-wave slowness values.

4. The method of claim 1, wherein the receivers are set in a distal face of a protrusion on the tool.

5. The method of claim 4, further comprising: generating acoustic waves using a transmitter on the distal face, said distal face being on a stabilizer blade attached to the tool.

6. The method of claim 5, further comprising:

generating acoustic waves using a second transmitter on the distal face of said stabilizer blade, wherein the receivers are on a line between the transmitters and spaced equally from a midpoint between the transmitters.

7. The method of claim 5, wherein the receivers are less than 2 inches apart and are no more than 20 inches from the transmitter.

8. The method of claim 4, wherein the distal face remains within 0.3 inches of the borehole wall as the tool rotates.

9. The method of claim 1, further comprising transmitting waveforms via wired drillpipe to the surface for processing.

10. The method of claim 1, wherein said processing signals from the receivers to measure formation density includes using a fluid cell to measure acoustic impedance of fluid in the borehole.

* * * * *